US008775003B2

(12) United States Patent
Jang et al.

(10) Patent No.: US 8,775,003 B2
(45) Date of Patent: Jul. 8, 2014

(54) METHODS AND SYSTEMS FOR CONTROLLING A PROPORTIONAL INTEGRATOR

(71) Applicant: GM Global Technology Operations LLC, Detroit, MI (US)

(72) Inventors: Seok-Joo Jang, Irvine, CA (US); Lihua Li, Torrance, CA (US); Ray M. Ransom, Big Bear City, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 37 days.

(21) Appl. No.: 13/687,748

(22) Filed: Nov. 28, 2012

(65) Prior Publication Data

US 2014/0148981 A1    May 29, 2014

(51) Int. Cl.
*B60L 9/00* (2006.01)

(52) U.S. Cl.
USPC ............... 701/22; 701/29.9; 701/60; 903/903

(58) Field of Classification Search
USPC ................. 701/22, 36, 42, 29.9, 60; 903/903; 180/65.21, 65.265
See application file for complete search history.

(56) References Cited

U.S. PATENT DOCUMENTS

| 4,887,015 | A | * | 12/1989 | Kurakake et al. | 318/609 |
|---|---|---|---|---|---|
| 5,373,258 | A | * | 12/1994 | Gerot et al. | 331/14 |
| 5,452,200 | A | * | 9/1995 | Barry | 700/41 |
| 5,497,063 | A | * | 3/1996 | Day et al. | 318/610 |
| 5,703,750 | A | * | 12/1997 | Kim et al. | 361/187 |
| 7,977,898 | B2 | | 7/2011 | Jang et al. | |
| 2011/0109292 | A1 | | 5/2011 | Jang et al. | |

* cited by examiner

*Primary Examiner* — Gertrude Arthur Jeanglaude
(74) *Attorney, Agent, or Firm* — Ingrassia Fisher & Lorenz, P.C.

(57) ABSTRACT

Methods and apparatus are provided for controlling a boost converter. In one embodiment, the method processes a command signal in a slew rate limiting circuit. The output of the slew rate limiting circuit is then processed using one or more feedback parameters from the proportional integrator to provide a processed command signal. The processed command signal is processed with a controlled signal to provide an error signal which is provided to the proportional integrator to provide a current command signal. In one embodiment, the apparatus includes an error generating circuit configured to provide a processed command signal using one or more feedback parameters from the proportional integrator, and to provide the error signal by subtracting a signal to be controlled from the processed command signal. A slew rate limiting circuit is used to receive a command signal and provide an output to the error generating circuit.

20 Claims, 3 Drawing Sheets

METHODS AND SYSTEMS FOR CONTROLLING A PROPORTIONAL INTEGRATOR

TECHNICAL FIELD

The technical field generally relates to controlling proportional integrators, and more particularly relates to systems and methods for combining proportional integrator control and slew rate limiting.

BACKGROUND

Proportional integrators are a control loop feedback system commonly used in vehicular power electronic systems. For example, fuel cell electric vehicles or hybrid electric vehicles often use two separate voltage sources (e.g., a battery and a fuel cell) to power electric motors that drive the wheels. Such systems employ power converters (or boost converters) that utilize one or more proportional integrators to control or regulate the boost converter.

In certain applications (e.g., fuel cell applications) the highest performance limiting factor is the boost converter slew rate limit. However, in the current mode of operation of a boost converter, the proportional integrator may become saturated, which in turn, causes the slew rate limiting function to lose control over the current slew rate. The deeper into saturation the proportional integrator becomes, the longer it takes to recover to normal operation and regain control for the protection of the fuel cell.

Accordingly, it is desirable to provide a proportional integrator that may be employed in a fuel cell implementation that will protect the fuel cell from damage. In addition, it is desirable to provide boost converter control systems and methods that aren't impeded by the proportional integrator being saturated while maintaining slew rate limiting. Furthermore, other desirable features and characteristics of the present invention will become apparent from the subsequent detailed description and the appended claims, taken in conjunction with the accompanying drawings and the foregoing technical field and background.

SUMMARY

A method is provided for controlling a proportional integrator. The method processes a command signal in a slew rate limiting circuit to determine whether to limit the command signal. The output of the slew rate limiting circuit is then processed using one or more feedback parameters from the proportional integrator to provide a processed command signal. The processed command signal is processed with a controlled signal to provide an error signal which is provided to the proportional integrator to provide a current command signal.

An apparatus is provided for controlling a proportional integrator that processes an error signal and provide a current command signal. The apparatus includes an error generating circuit configured to provide a processed command signal using one or more feedback parameters from the proportional integrator, and to provide the error signal by subtracting a signal to be controlled from the processed command signal. A slew rate limiting circuit is used to receive a command signal and determine whether to limit the command signal prior to providing an output to the error generating circuit.

A system is provided for controlling a proportional integrator. The system includes an energy source and a boost converter coupled to the energy source that provides an output voltage (a signal to be controlled) responsive to a current command signal. An inverter is coupled to the boost converter to process the output voltage and provide multiple phased currents to a multi-phase motor for a vehicle. A controller is coupled to the boost converter for providing the current command signal by processing a command signal in a current limit controller. The current limit controller includes an error generating circuit configured to provide a processed command signal using one or more feedback parameters from a proportional integrator, and to provide an error signal by subtracting the signal to be controlled from the processed command signal. A slew rate limiting circuit is used to receive the command signal and determine whether to limit the command signal prior to providing an output to the error generating circuit

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to vehicle electrical and mechanical parts and other functional aspects of the disclosure (and the individual operating components of the disclosure) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the disclosure.

Figure 1:
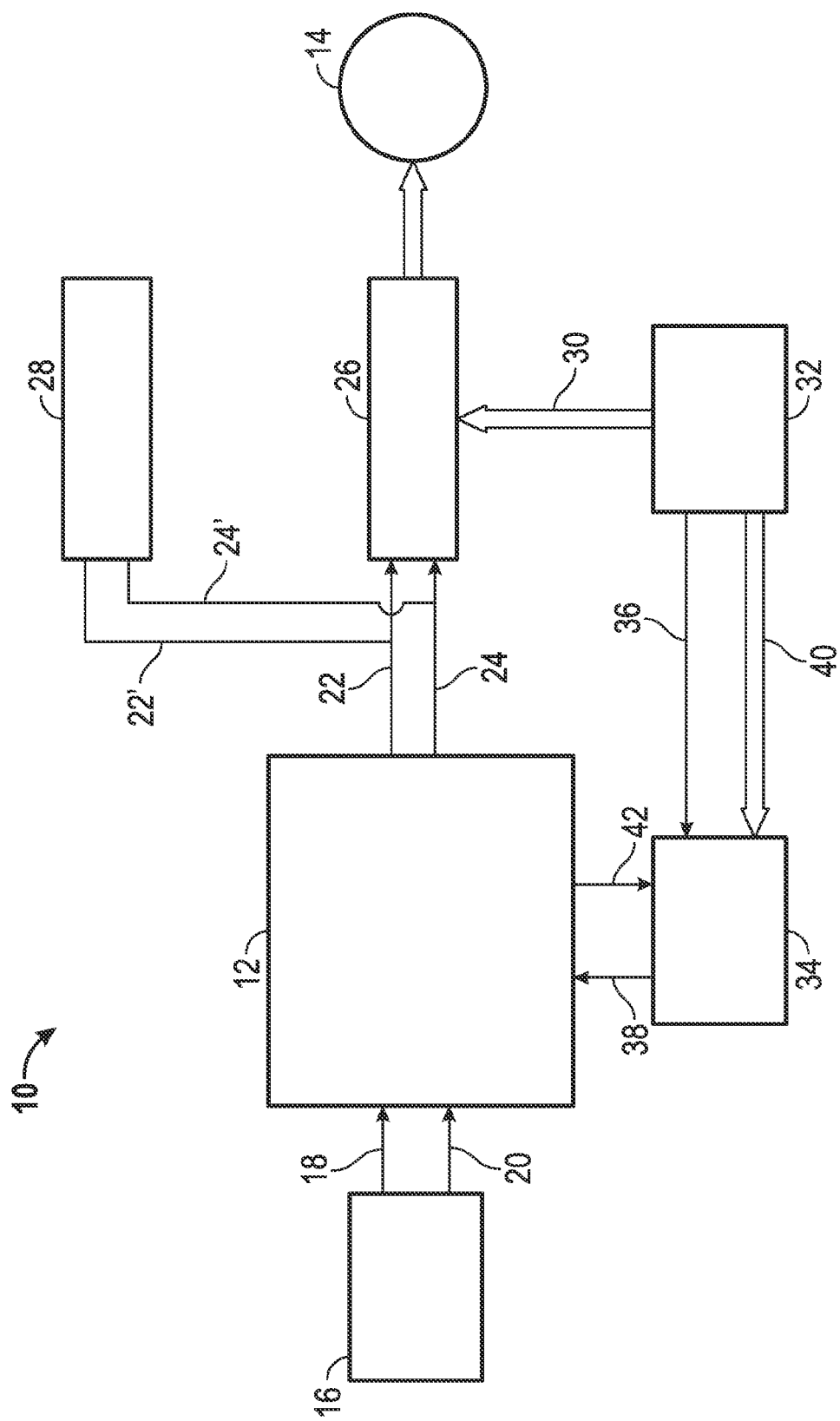
FIG. 1 is a block diagram of a high voltage motor system for a vehicle that incorporates a boost converter in accordance with an embodiment.

Referring to the drawings, wherein like reference numbers refer to like components, FIG. 1 an electric motor system 10 utilizing a boost converter 12 in accordance with exemplary embodiments is shown. The electric motor system 10 includes an electric motor 14 (for example, a three-phase electric motor) such as an induction machine or a permanent magnet electric motor, which operates to propel a vehicle in accordance with exemplary embodiments. To provide power to the electric motor 14, power from a power source 16 is provided by leads 18 and 20 to the boost converter 12. The boost converter 12 operates to boost the output voltage (and reduce the current due to conservation of energy) provided at leads 22 and 24 that couple the boost converter 12 to an inverter 26 (or other motor control circuit) and to an energy storage unit (e.g., battery) 28 via leads 22' and 24'. The energy storage unit 28 operates as energy buffer keeping the voltage at the input of the inverter 26 constant. The inverter 26 operates in a conventional manner in response to operational control signals 30 from a controller 32 to provide voltage to each phase or motor winding of the electric motor 14.

The controller 32 performs the computation and control functions of the electric motor system 10, and may comprise any type of processor or multiple processors, single integrated circuits such as a microprocessor, or any suitable number of integrated circuit devices and/or circuit boards working in cooperation to accomplish the functions of a processing unit. The controller 32 may include a memory that contains operational programs, instructions and/or variables or parameters useful for operating the electric motor system 10. Such memory could include various types of dynamic random access memory (DRAM) such as SDRAM, various types of static RAM (SRAM), and various types of non-volatile memory (PROM, EPROM, and flash).

According to exemplary embodiments, the electric motor system 10 also includes a current limit controller 34 that determines whether system conditions exist that warrant a modification or limiting of an input command 36, that may be provided in some embodiments by the controller 32. That is, during normal operation, the input command 36 may simply be passed along from the current limit controller 34 to the boost converter 12 as the boost converter current command signal 38. However, during system situations warranting a limiting condition, the current limit controller 34 limits the current command signal 38 provided to the boost converter 12 for the overall protection of the system. As will be discussed in more detail below, the current limit controller 34 includes a slew rate limiter and proportional integrator system that provides a current limiting function to determine whether to limit the input command 36 to provide the current command signal 38 to the boost converter 12. In performing these determinations, the current limit controller 34 processes other programmed parameters or variables provided via programming lines 40 from the controller 32 as well as feedback signals (e.g., output voltage) 42 from the boost converter 12.

Figure 2:
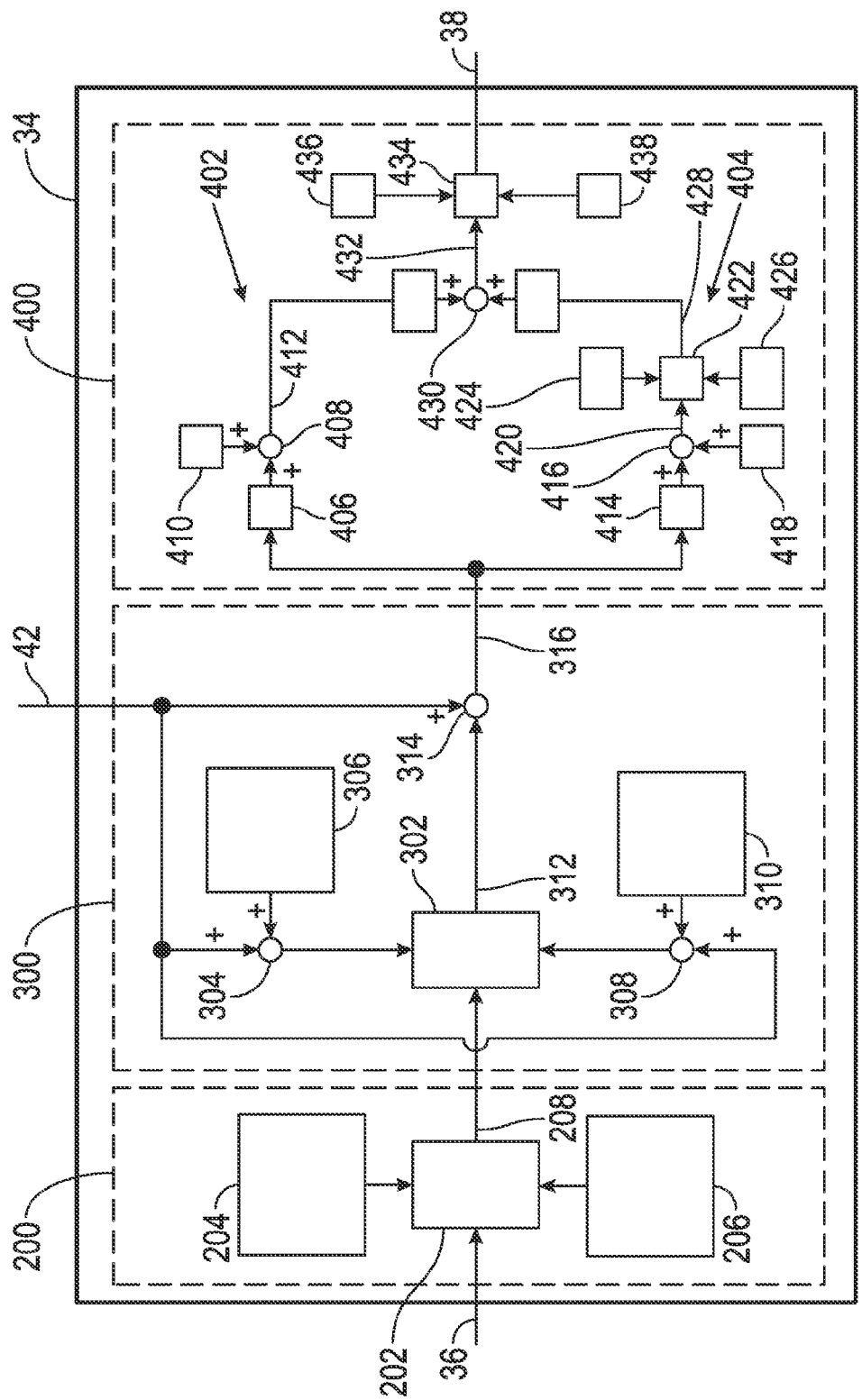
FIG. 2 is a block diagram of the integrated proportional integrator and slew rate controller for the boost converter of FIG. 1 in accordance with an embodiment.

Referring now to FIG. 2, a block diagram of the current limit controller 34 is shown as including a slew rate limiting circuit 200, an error generating circuit 300 and a proportional integrator 400. It will be appreciated that more, fewer or other current limit circuits could be employed in any particular implementation of the current limit controller 34 and the current limit configuration discussed below represent but one of numerous exemplary embodiments contemplated by the present disclosure.

The slew rate limit circuit 200 operates to determine whether to limit the input command 36 to prevent the boost converter (12 in FIG. 1) from exceeding an output voltage slew rate limit. To do this, an input command 36 (which may be a voltage command signal provided by the controller 32 of FIG. 1) is applied to a limiter 202. In one embodiment, the upper limit 204 and lower limit 206 are set as described in equations (1) and (2) respectively:

Upper Limit 204: Pervious Processed Voltage Command+up-slew-rate-limit. (1)

Lower Limit 206: Pervious Processed Voltage Command−down-slew-rate-limit. (2)

where:
the Pervious Processed Voltage Command is provided by the error generating circuit 300 (discussed below); and
up and down slew-rate-limit is pre-defined, for example, plus or minus (respectively) 0.3V per unit time (sample).
The output 208 of the limiter 202 is a slew rate limited version of the input command 36, which is applied to the error generating circuit 300.

The error generating circuit 300 produces an error signal 316 that controls the proportional integrator 400 to be maintained slightly in a saturated state. To do this, the output 208 of the slew rate limiting circuit 200 is received by a limiter 302. The upper limit 306 of the limiter 302 is provided as the sum (via summer 304) of the signal desired to be controlled (in this example, the output voltage 42 of the boost converter 12 in FIG. 1) and an upper limit value set as described in equation (3) below. The lower limit 310 of the limiter 302 is set as the sum (via summer 308) of the signal desired to be controlled (42 in this example) and a lower limit value set as described in equation (4) below.

$$\text{Upper Limit 306: } \frac{Plim - \text{Previous Iterm} - FF}{Kp + Ki} \quad (3)$$

$$\text{Lower Limit 310: } \frac{Nlim - \text{Previous Iterm} - FF}{Kp + Ki} \quad (4)$$

where:
Plim is the positive proportional limiting term;
Nlim is the negative proportional limiting term;
Pervious Iterm is the previous sample of the integral path of the proportional integrator 400;
FF is feed-forward term, which in some embodiments may have a zero value;
Kp is the gain factor of the proportional path of the proportional integrator 400; and
Ki is the gain factor of the integral path of the proportional integrator 400.
All of these values are feedback from the proportional integrator 400 (current sample or previous sample), and the origin of each value will be discussed in detail below in connection with the proportional integrator 400.

The output 312 of the limiter 302 comprises a Processed Command Signal, the pervious sample of which (Pervious Processed Voltage Command) is used in equations (1) and (2) above to set the upper and lower limits (respectively) of the limiter 202. The Processed Voltage Command 312 is applied to a summer 314 which also receives a controlled signal (i.e., the signal desired to be controlled, which in this example, is the output voltage 42 of the boost converter 12 in FIG. 1). The controlled signal is subtracted from the Processed Command Signal, which produces an error signal 316 that will be applied to the proportional integrator 400.

The proportional integrator 400 operates to determine whether to limit the output current command 38 to prevent the boost converter (12 in FIG. 1) from exceeding a maximum output voltage limit. To do this, the output 316 from the error generating circuit 300 processed through a proportional branch 402 and an integral branch 404. Processing in the proportional branch 402 begins with a gain adjustment in gain stage 406. The gain adjustment is made by a gain factor (Kp), which is also used in equations (3) and (4) above and may be a fixed value determined by application or provided by the controller (32 in FIG. 1) via the programming lines (40 in FIG. 1). The gain adjusted error signal is summed (via summer 408) with a feed forward (FF) value 410, which was also used in equations (3) and (4) above, and in some embodiments may have a zero value. In some embodiments, the FF value 410 may be an empirically-determined constant. In some embodiments, the FF value 410 can be adaptively computed elsewhere, for example, in the controller (32 in FIG. 1). In some embodiments, the FF value 410 can be provided by some other calculation path from the system as determined by the system designers.

The error signal 316 is also processed through an integral branch 404 of the proportional integrator 400. Processing in the integral branch 404 begins with a gain adjustment in gain stage 414. The gain adjustment is made by a gain factor (Ki), which is also used in equations (3) and (4) above and may be a fixed value determined by application or provided by the controller (32 in FIG. 1) via the programming lines (40 in FIG. 1). The gain adjusted error signal is summed (via summer 416) with a previous sample of the Iterm 418, which was also used in equations (3) and (4) above, and comprises the previous Iterm value provided as the output of the limiter 422 discussed below. The output 420 of the summer 416 is received by the limiter 422 and passed through or limited between an upper limit 424 and a lower limit 426. The upper and lower limit values are given by equations (5) and (6), respectively.

$$\text{Upper Limit 424: Plim} + 10 - \text{Pterm} \tag{5}$$

$$\text{Lower Limit 426: Nlim} - 10 - \text{Pterm} \tag{6}$$

where:
Plim is the positive proportional limiting term (discussed below);
Nlim is the negative proportional limiting term (discussed below);
Pterm is the proportional term 412 (discussed above); and
10 is a constant value used for margin/noise tolerance. This constant may be a fixed value as in this example or may be provided by the controller (32 in FIG. 1).

The output of the limiter 422 comprises the Iterm 428, the previous sample of which is used in equations (3) and (4) and as an input to the summer 416. The Iterm 428 and the Pterm 412 are then summed (via summer 430) to provide a combined Pterm/Iterm signal 432. The Pterm/Iterm signal 432 is limited between an upper (positive) limit 436 (Plim) and a lower (negative) limit 438 (Nlim) which may be fixed values in some embodiments or provided by the controller (32 in FIG. 1) via the programming lines (40 in FIG. 1). The output of the limiter 434 comprises the current command signal 38 to the boost converter (12 of FIG. 1) in the illustrated example.

During operation, the error signal 316 is positive, which drives the proportional integrator 400 slightly into saturation. If a large transient should occur (e.g., higher than the upper slew rate limit 204), the error signal will become negative and the proportional integrator 400 recovers from the saturated state and reduces the output current command 38, which in turn, forces the boost convertor output voltage 42 to follow the processed voltage signal 312. By feeding back the parameters of the proportional integrator 400 to the error generating circuit 300, and the processed voltage command 312 to the slew rate limiting circuit 200, the current limit controller (34 in FIG. 1) has the advantage of maintaining proper operation of the slew rate limiting circuit 200 regardless of the boost converter operating state (e.g., voltage mode or current mode) and regardless of whether the proportional integrator is in saturation or not.

Figure 3:
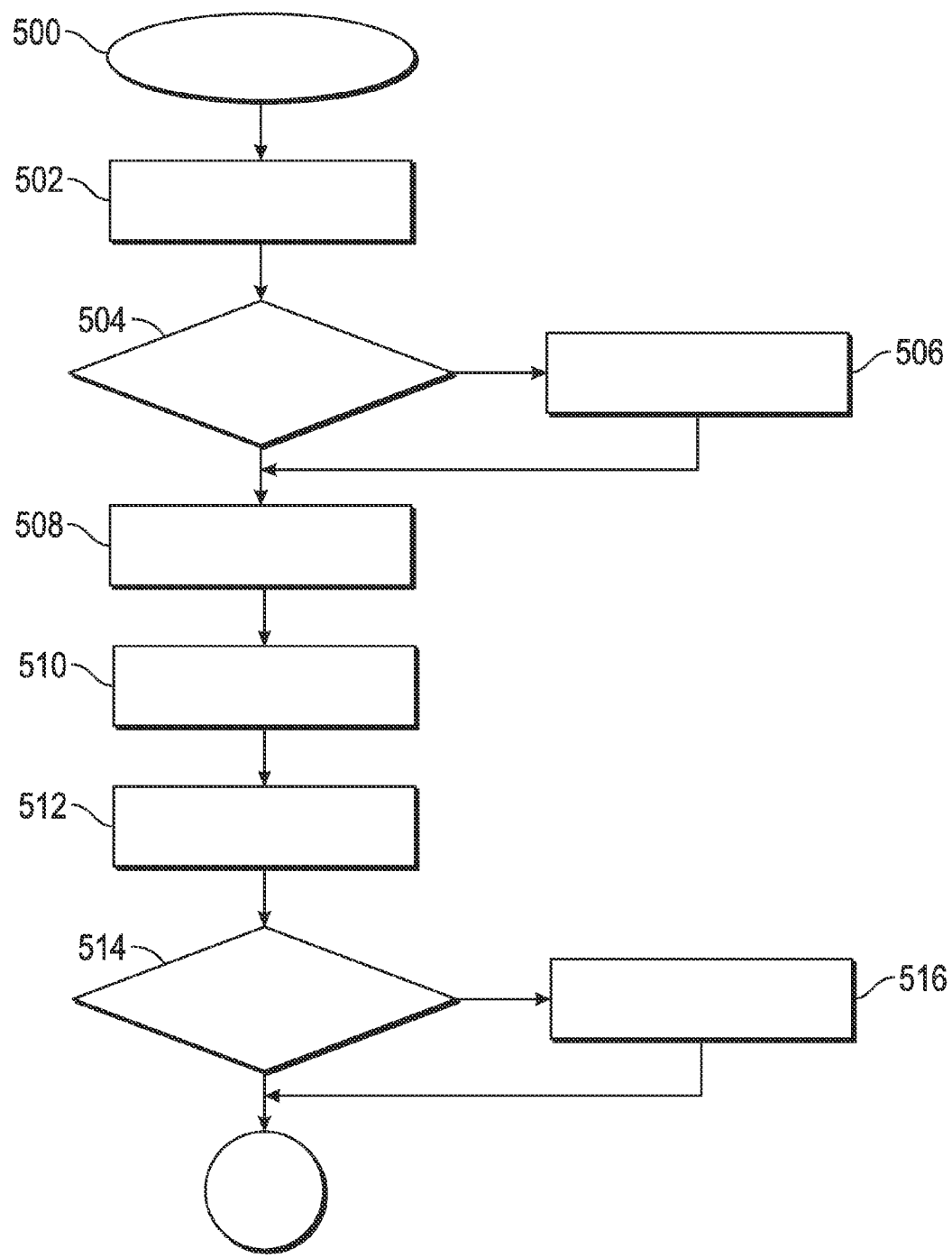
FIG. 3 is a flow diagram illustrating an exemplary method for proportional integrator in accordance with an exemplary embodiment.

Referring now to FIG. 3, a flow diagram of a method 500 useful for controlling the operation of a boost converter (12 of FIG. 1) is shown. The various tasks performed in connection with the method 500 of FIG. 3 may be performed in some embodiments by a processing apparatus executing software. For illustrative purposes, the following description of the method of FIG. 3 may refer to elements mentioned above in connection with FIGS. 1-2. In practice, portions of the method of FIG. 3 may be performed by different elements of the described system. It should also be appreciated that the method of FIG. 3 may include any number of additional or alternative tasks and that the method of FIG. 3 may be incorporated into a more comprehensive procedure or process having additional functionality not described in detail herein. Moreover, one or more of the tasks shown in FIG. 3 could be omitted from an embodiment of the method of FIG. 3 as long as the intended overall functionality remains intact.

The routine begins in step 502 which receives the input command 36 (FIG. 2). Next, decision 504 determines whether to apply a slew rate limit function (200 in FIG. 2). An affirmative determination applies the limit (step 506) as discussed above in connection with FIG. 2 before proceeding to decision 508. A negative determination proceeds to decision 508, which provides the processed voltage command signal (312 in FIG. 2). Next, step 510 computes the error signal (316 in FIG. 2) as the sum of the output voltage (42 in FIG. 2) of the boost converter (12 in FIG. 1). The processed voltage command and the error signal are determined using feedback parameters of the proportional integrator (400 in FIG. 2) as discuss above.

The error signal computed in step 510 is next processed in the proportional integrator. First, the scaled proportional and integral terms of the error signal are determined in step 512. Decision 514 then determines whether to apply a limit to the output current command (38 in FIG. 2). An affirmative determination applies the limit (step 516) and then the routine is complete for the current sample and may loop back to begin again with step 502 for the next sample.

Accordingly, method and systems for controlling a proportional integrator (and thus a boost converter) are provided for use in a vehicle. Use of the current limit controller 34 that feeds back parameters of the proportional integrator 400 to the error generating circuit 300, and the processed voltage command 312 to the slew rate limiting circuit 200, provides the advantage of maintaining proper operation of the slew rate limiting circuit 200 regardless of the boost converter operating state (e.g., voltage mode or current mode) and regardless of whether the proportional integrator is in saturation or not.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a proportional integrator responsive to a command signal, comprising the steps of:
   processing the command signal via a slew rate limiting circuit to determine whether to limit the command signal;
   processing an output signal of the slew rate limiting circuit using one or more feedback parameters from the proportional integrator to provide a processed command signal;
   processing the processed command signal and a controlled signal to provide an error signal; and
   processing the error signal in the proportional integrator to provide a current command signal.

2. The method of claim 1, wherein processing the command signal comprises processing the command signal in the slew rate limiting circuit have an upper limit value and a lower limit value.

3. The method of claim 2, wherein the upper limit value and the lower limit value are computed using one or more feedback parameters from an error generating circuit.

4. The method of claim 3, wherein the upper limit value and the lower limit value are computed using a previous sample of the processed command signal.

5. The method of claim 1, further comprising processing the current command signal in a boost converter to provide the controlled voltage.

6. A method for controlling a proportional integrator to control an output voltage from a boost converter, the proportional integrator being responsive to a command signal, comprising the steps of:
   processing the command signal via a slew rate limiting circuit to determine whether to limit the command signal;
   processing an output signal of the slew rate limiting circuit using one or more feedback parameters from the proportional integrator to provide a processed command signal;
   subtracting a signal to be controlled from the processed command signal to provide an error signal;
   processing the error signal in the proportional integrator to provide a current command signal; and
   processing the current command signal in the boost converter to provide the controlled signal.

7. The method of claim 1, wherein processing the command signal comprises processing the command signal in the slew rate limiting circuit have an upper limit value and a lower limit value.

8. The method of claim 2, wherein the upper limit value and the lower limit value are computed using are computed using a previous sample of the processed command signal.

9. A system, comprising:
   a proportional integrator configured to process an error signal and provide a current command signal;
   an error generating circuit configured to provide a processed command signal using one or more feedback parameters from the proportional integrator and to provide the error signal by subtracting a signal to be controlled from the processed command signal; and
   a slew rate limiting circuit configured to receive a command signal and determine whether to limit the command signal prior to providing an output to the error generating circuit.

10. The system of claim 9, wherein the slew rate limiting circuit limits the command signal between an upper limit and a lower limit.

11. The system of claim 10, wherein the upper limit and the lower limit are computed using feedback parameters from the error generating circuit.

12. The system of claim 11, where the upper limit and the lower limit are computed using a previous sample of the processed command signal.

13. The system of claim 9, which includes a boost converter providing the signal to be controlled responsive current command signal.

14. The system of claim 13, wherein the processed command signal is provided by a limiting circuit configured to determine whether to limit the output of the slew rate limiting circuit.

15. The system of claim 14, wherein the limiting circuit has an upper limit and a lower limit.

16. The system of claim 15, wherein the upper limit and the lower limit are computed using one or more feedback parameters from the proportional integrator.

17. A system, comprising:
   an energy source;
   a boost converter coupled to the energy source and providing an output voltage responsive to a current command signal;
   an inverter coupled to the boost converter to process the output voltage and provide multiple phased currents to a multi-phase motor for a vehicle;
   a controller coupled to the boost converter for providing the current command signal by processing a command signal in a current limit controller comprising:
   a proportional integrator configured to process an error signal and provide a current command signal;
   an error generating circuit configured to provide a processed command signal using one or more feedback parameters from the proportional integrator and to provide the error signal by subtracting a signal to be controlled from the processed command signal; and
   a slew rate limiting circuit configured to receive a command signal and determine whether to limit the command signal prior to providing an output to the error generating circuit.

18. The system of claim 17, wherein the slew rate limiting circuit limits the command signal between an upper limit and a lower limit.

19. The system of claim 18, where the upper limit and the lower limit are computed using a previous sample of the processed command signal.

20. The system of claim 17, wherein the energy source comprises a fuel cell.

* * * * *